United States Patent [19]

Sassak

[11] 4,388,749
[45] Jun. 21, 1983

[54] U-BOLT PIPE CLAMP ASSEMBLY

[75] Inventor: Frank Sassak, Riverview, Mich.

[73] Assignee: McInerney Spring & Wire Company, Grand Rapids, Mich.

[21] Appl. No.: 346,734

[22] Filed: Feb. 8, 1982

[51] Int. Cl.³ .............................................. F16L 13/14
[52] U.S. Cl. .................................... 24/277; 285/382.2; 285/420; 24/276
[58] Field of Search ................... 24/277, 276; 285/420, 285/382.2, 382.4, DIG. 14, 197, 198, 199

[56] References Cited

U.S. PATENT DOCUMENTS 2,993,255  7/1961  Jagiel ...................................... 24/277
4,147,384  4/1979  Heckethorn ............................ 24/277

Primary Examiner—Gene Mancene
Assistant Examiner—James Hakomaki
Attorney, Agent, or Firm—Cullen, Sloman, Cantor, Grauer, Scott & Rutherford

[57] ABSTRACT

A U-bolt clamp assembly for securing together the annular overlap of a pair of telescoped engaging pipes having a U-bolt having a semi-circular bight portion terminating in a pair of legs having threaded ends. A saddle plate assembly includes a saddle plate having a concave seat of semi-circular shape and a pair of spaced keys at the upper ends of the saddle plate seat. The saddle plate assembly is apertured at its ends to receive the U-bolt legs. Opposed keyways upon the interior of the legs interlockingly receive the keys. Fasteners upon the U-bolt ends are tightly drawn into compressive engagement drawing together the U-bolt and saddle plate assembly. The U-bolt bight and the concave seat deform both pipes forming concentric annular channels therein and a bead in the outer pipe nested within the channel of the inner pipe so that the U-bolt and saddle are mechanically interlocked with the outer pipe and the pipes are annularly interlocked, secured and sealed throughout 360°.

13 Claims, 12 Drawing Figures

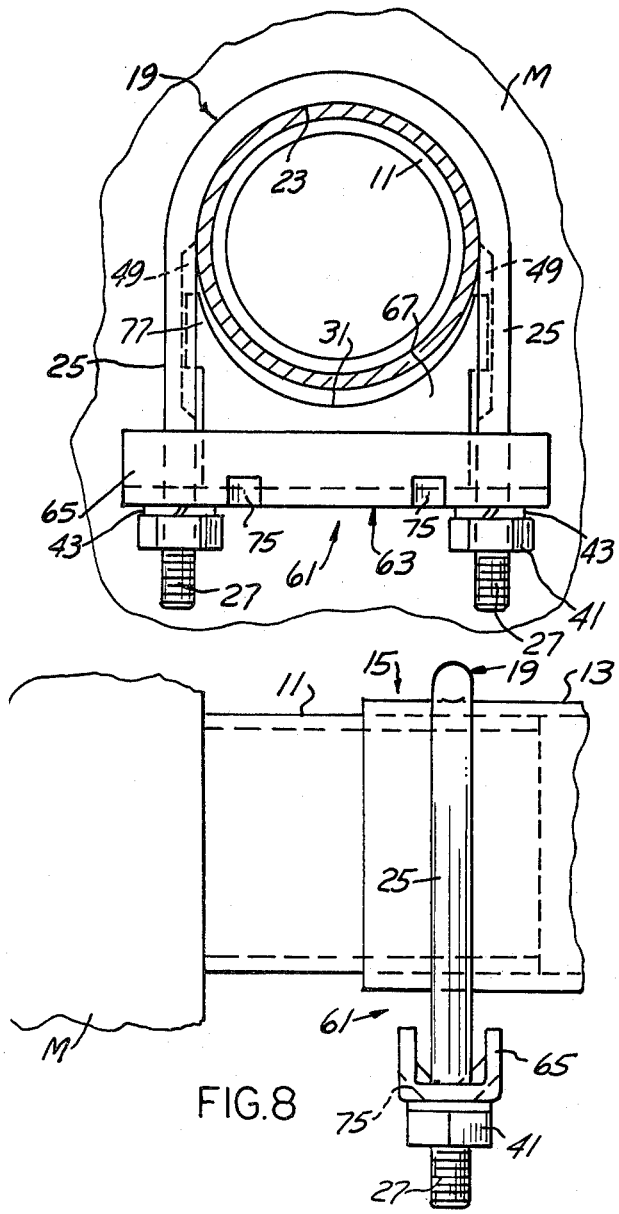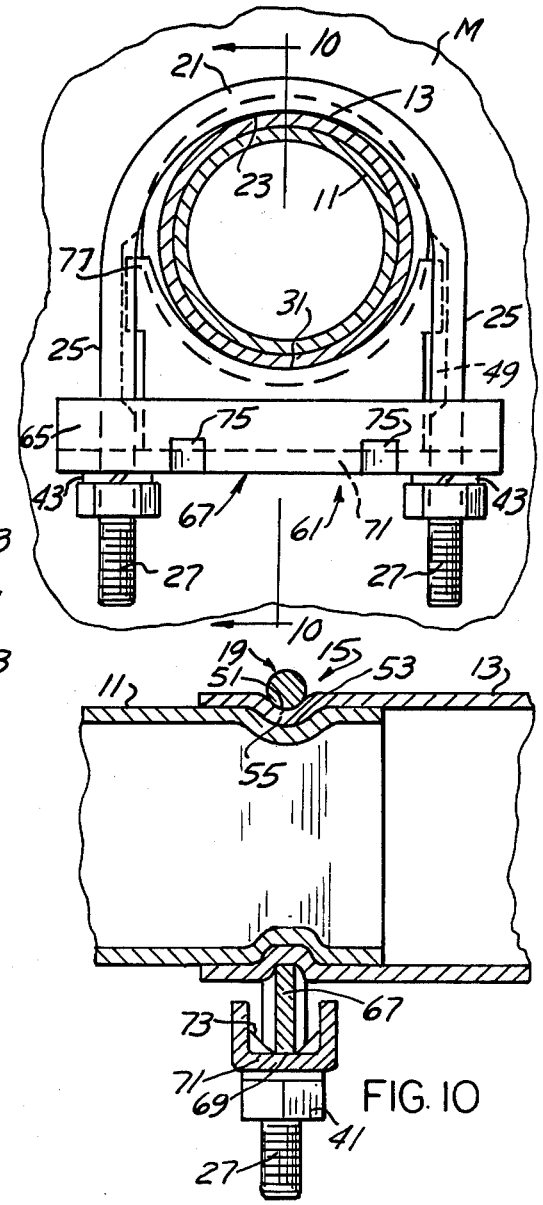

U-BOLT PIPE CLAMP ASSEMBLY

BACKGROUND OF THE INVENTION

Heretofore in connection with a pair of telescoped engaging pipes, such as the outlet of a muffler, exhaust manifold or catalytic convertor and the corresponding exhaust pipe of a vehicle, though not limited thereto, there has long existed the problem of effectively securing the pipes together at their overlap and at the same time providing a seal between the assembled pipes and for securing the clamp to the outer pipe.

Various types of U-bolt saddle clamp assemblies have been employed to interconnect the pipes at their overlap. The difficulty with current pipe clamps is that they do not provide an effective mechanical interlock between the pipes and they do not provide an efficient seal between the pipes preventing the escape of exhaust gases to atmosphere and do not provide a positive interlock between the clamp and the pipes.

Heretofore in the telescoping assembly of the outlet of a muffler or a catalytic converter and the corresponding engaging exhaust pipe of a vehicle, the U-bolt clamp consisted of a pair of non-symmetrical parts, which at most provided a friction interlock between the overlapped pipes and usually required the drawing up and tightening of the clamp parts by fasteners.

Heretofore under severe compression sufficient to deform the pipes, the saddle plate has deflected out of the plane of the U-bolt for an inferior connection.

THE PRIOR ART

Listed below are a number of patents illustrative of the prior art:

| PATENT NO. | NAME | DATE |
|---|---|---|
| 1,520,032 | H. W. McCullouch | December 23, 1924 |
| 2,693,975 | T. L. Smith | November 9, 1954 |
| 2,693,975 | T. L. Smith | November 9, 1954 |
| 2,719,345 | W. F. Riker | October 4, 1955 |
| 2,908,470 | D. F. Garman | October 13, 1959 |
| 2,959,834 | R. A. Graham, et al | November 15, 1960 |
| 2,993,255 | Z. J. Jagiel | July 25, 1961 |
| 3,137,053 | N. J. Osborn, et al | June 16, 1964 |
| 3,192,593 | N. J. Osborn, et al | July 6, 1965 |
| 3,284,866 | J. C. Zimmerman | November 15, 1966 |
| 3,604,676 | Walter H. Weber | September 14, 1971 |
| 3,605,214 | K. L. Spotts, et al | September 20, 1971 |
| 3,772,745 | Dowling, et al | November 20, 1973 |
| 3,879,815 | Dowling, et al | April 29, 1975 |
| 3,900,933 | M. Cengmay | August 26, 1975 |
| 3,955,250 | Heckethorn | May 11, 1976 |
| 3,984,134 | Engman, et al | October 5, 1976 |
| 4,040,152 | Gilgallon | August 9, 1977 |
| 4,056,869 | Eisma, Jr. | November 8, 1977 |
| 4,079,487 | Coop, Sr. | March 21, 1978 |
| 4,122,586 | Nothdurft | October 31, 1978 |
| 4,147,384 | J. Heckethorn | April 3, 1979 |
| 4,183,122 | Wagner | January 15, 1980 |

SUMMARY OF THE INVENTION

An important feature of the present invention is to provide a pipe clamp for securing together the annular overlap of a pair of assembled engaging inner and outer pipes using a U-bolt and saddle which concentrically overlie the pipes at their overlap and are drawn together by fasteners. It is a further feature to provide a U-bolt saddle clamp which forms concentric outer channels in the pipes and a corresponding inner annular bead in the outer pipe nested within the channel upon the inner pipe for providing an annular mechanical interlock and seal between the pipes throughout 360° and a mechanical interlock between the clamp and the outer pipe.

A further feature to provide a novel method of clamping together a pair of telescoped engaging pipes to provide a mechanical interlock between the pipes as well as an annular seal throughout 360° and at the same time provide a mechanical interlock between the clamp and the pipes.

It is a further feature of providing in conjunction with a pair of assembled telescoped pipes with a U-bolt and concave saddle positionable over the pipes wherein their internal diameters are reduced after assembly thereon so as to provide a mechanical interlock between the pipes, an annular seal between the pipes and a mechanical interlock between the ring body and the pipes.

These and other objects and features will be seen from the following specification and claims in conjunction with the appended drawing.

THE DRAWING

FIG. 7 is a fragmentary sectional view of a modified U-bolt clamp assembly for a pair of telescoped engaging pipes.

FIG. 8 is a fragmentary right side elevational view thereof.

FIG. 9 is a view similar to FIG. 7, with U-bolt and saddle plate assembly tightly drawn up with respect to the assembled pipes of FIG. 7.

FIG. 10 is a vertical section taken in the direction of arrows 10—10 of FIG. 9.

FIG. 11 is a top plan view of the clamp assembly shown in FIG. 7.

FIG. 12 is a bottom plan view of the U-bolt clamp assembly in FIG. 7 with the fasteners removed.

It will be understood that the above drawings illustrate merely an embodiment of the invention and one form of apparatus of accomplishing the method of the present invention and that other embodiments are contemplated within the scope of the claims hereafter set forth.

DETAILED DESCRIPTION OF AN EMBODIMENT OF THE PIPE CLAMP

Figure 2:
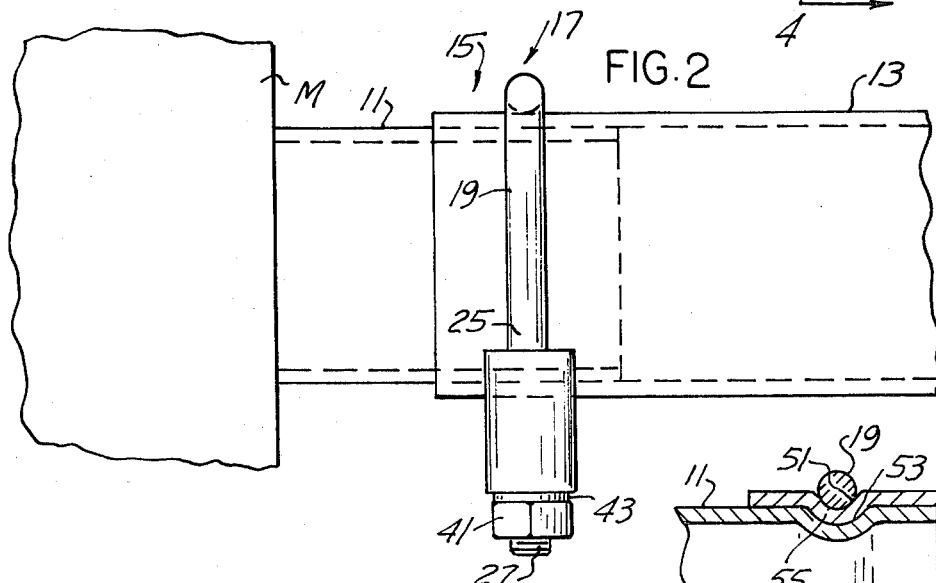
FIG. 2 is a longitudinal section in the direction of arrows 2—2 of FIG. 1 showing the positioning of the present U-bolt saddle clamp around the overlap of said pipes.

Referring to the drawing, a muffler M, fragmentarily shown in FIG. 2, includes an outlet pipe 11 over which is telescoped an exhaust or other pipe 13 of a vehicle in engaging relation and defining between the two pipes the overlap 15. While the drawing illustrates the connection of the outlet pipe of a muffler, manifold or catalytic converter to the exhaust pipe of a vehicle, the present invention is not limited thereto, but is more broadly directed to the clamping of a pair of telescoped engaging pipes at their overlap.

Figure 1:
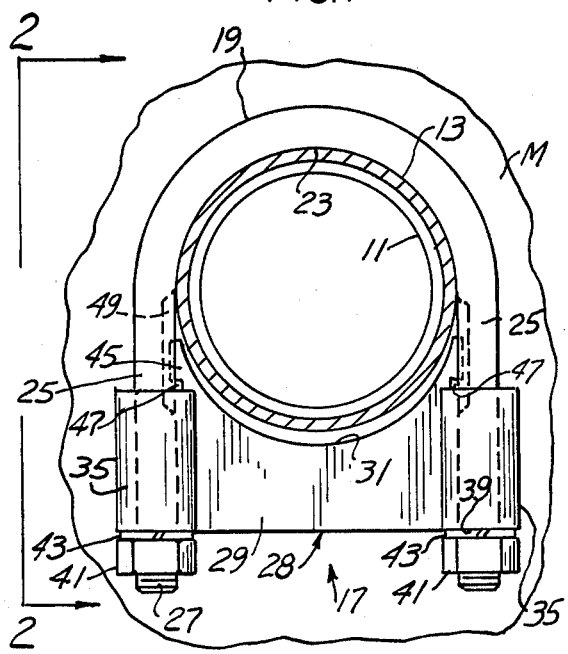
FIG. 1 is a fragmentary sectional view of a vehicle muffler having an outlet pipe to which an exhaust pipe of a vehicle is secured by the present U-bolt clamp.
Figure 3:
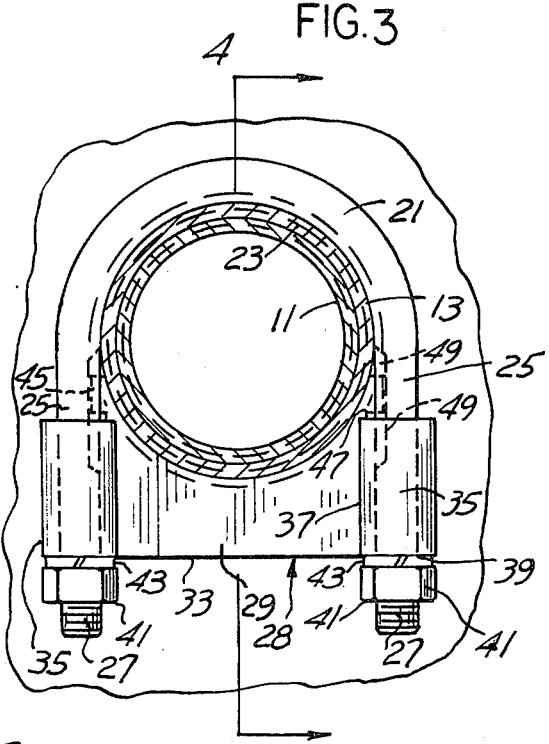
FIG. 3 is a similar view after clamping.

Referring particularly to FIGS. 1, 2 and 3, the present pipe clamp 17 is in the form of U-bolt 19 made of steel, as for example 1010-1020 steel, though not limited thereto, which is positioned around the assembled pipes 11, 13 at their overlap 15.

The U-bolt for the clamp assembly is designated at 19 having a bite portion 21 of semi-circular shape and having an inner semi-circular surface 23 which is transversely arcuate. The U-bolt includes a pair of legs 25 which at their ends have threaded terminals 27 over which is projected and secured to the present saddle 28.

Said saddle includes the upright saddle plate 29 having a concave seat 31 of substantially semi-circular shape and a transverse straight bottom edge 33.

Figure 6:
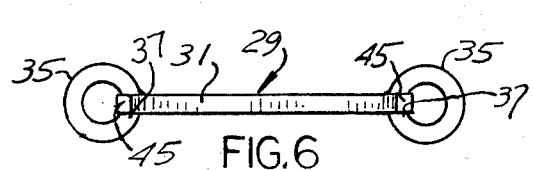
FIG. 6 is a plan view of the saddle plate.

Opposite ends of the saddle plate have formed as an integral part thereof the tubular portions 35 whose central axis lies in the general plane of the saddle plate 29. The tubular portions formed at the end of the saddle plate are curved around so that their end edges 37, FIG. 6, are closely adjacent saddle plate 29.

Each of the tubular portions has an abutment surface 39 which is coplanar with the saddle plate bottom edge 33. The saddle is secured with respect of the U-bolt by the use of fasteners or nuts 41 with interposed washers or lock washers 43, such as shown in FIG. 2.

Adjacent opposite ends of the saddle plate and inwardly of the tubular portions are a pair of upright deflectable keys 45 which include upper portions of the semi-circular concave seat 31, as best shown in FIGS. 1 and 3. Each of the respective keys 45 adjacent the upper edges of the tubular portions 35 are slotted as at 47 to render the keys flexible.

Formed upon the interior of the U-bolt legs 25 outwardly of the corresponding keys 45 are a pair of coplanar inwardly directed opposed keyways or slots 49. These slots are of a width greater than the width of the keys 45 and are adapted to receive portions of the keys 47 when the saddle plate 28 is compressively drawn into engagement with the corresponding overlapped pipes 11 and 13 upon tightening of the fasteners 41.

In operation with the U-bolt clamp assembly positioned around the overlap 15 of the pipes 11 and 13, such as shown in FIG. 1, the nuts 41 are tightened with respect to the corresponding abutment surfaces 39 for drawing up the saddle plate 28 with respect to the U-bolt 19 so as to compressively engage peripheral portions of the pipes 11 and 13 throughout 360°.

Figure 4:
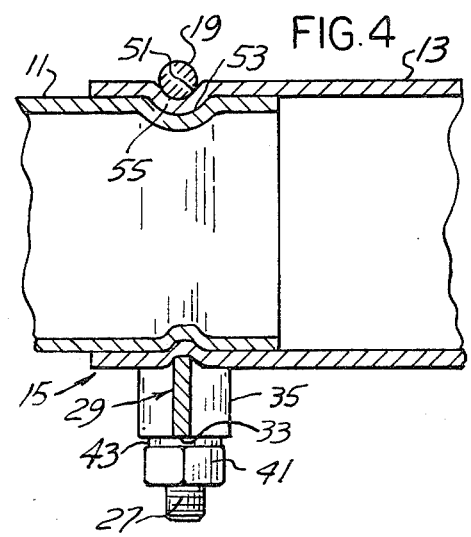
FIG. 4 is a vertical section taken in the direction of arrows 4—4 of FIG. 3.
Figure 5:
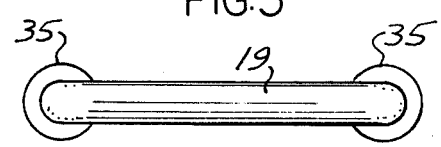
FIG. 5 is a fragmentary plan view of the saddle clamp.

In the procedure of drawing up the fasteners 41 with respect to the tubular portions, the corresponding semi-circular bight portion 21 of the U-bolt and the corresponding concave seat 31, each substantially semi-circular in shape, are snugly and compressively drawn against peripheral portions of the pipes resulting in the pipe deformation shown in FIG. 4. Here it is noted that drawing together of the saddle with respect to the U-bolt forms an outer annular channel 51 within outer pipe 13, an outer annular channel 53 within the inner pipe 11 and a corresponding annular bead 55 upon the interior of the outer pipe 13.

The respective channels and beads are coplanar as shown in FIG. 4 so that the bead 55 cooperatively nests and seals within annular channel 53 of pipe 11 for a mechanical interlock and seal therebetween throughout 360°. At the same time, the bight portion of the U-bolt and the corresponding concave seat of the saddle together forming a circle throughout 360° are nested and interlocked throughout 360° within the outer channel 51 of the pipe 13 thereby providing a mechanical interlock between the clamp assembly 17 and the telescoped pipes.

As the saddle 28 is snugly drawn compressively with respect to the U-bolt 19, the outer surfaces of the keys 45 corresponding to a portion of the concave seat 31 are deflected laterally outward as shown in FIG. 3 so as to retainingly nest and be interlocked within the corresponding key slots or channels 49 formed upon the interior of the legs 25 of the U-bolt.

By this construction, the saddle plate 29 is retained so as to be substantially coplanar with the central axis of the U-bolt 19. The clamp assembly has been tightened to thereby assure that there is formed corresponding channels 51, 53 and bead 55 all remaining in one plane to provide an interlock and mechanical seal between the respective pipes throughout 360 degrees.

In the illustration shown in FIG. 1 where the U-bolt clamp assembly 17 is loosely positioned around the pipes 11 and 13, there is shown the spacing between concave seat 31 of the saddle and the pipes. After the nuts 41 have been drawn up tightly with respect to the abutment surfaces 39 of the tubular portions 35, the concave seat as well as the semi-circular surface 23 of the bight of the U-bolt snugly and compressively engage peripheral portions of the pipes throughout 360°, and at the same time, keys 47 have been flexed outwardly from the position shown in FIG. 1 to the position shown in FIG. 3 so as to mechanically interlock with the keyways 49 formed in the U-bolt.

The present saddle 28 is of a unitary construction formed from a single plate 29 and the ends have been curved into the cylindrical tubular portions 35, as further illustrated in FIG. 6. The keys 45 forming an integral part of the saddle plate project above the tubular portions as shown in FIGS. 1 and 3.

The saddle in the illustrative embodiment is also constructed of 1010-1020 steel, though not limited thereto. The fasteners 41 are usually tightened with a power wrench so as to operatively and frictionally engage the abutment surfaces 39 of the tubular portions 35 which receive the U-bolt ends.

The present invention is directed to the U-bolt clamp assembly per se, as above described, the clamp combination with a pair of assembled engaging pipes, as well as the method of contracting the U-bolt assembly for accomplishing a mechanical interlock and seal between the assembled pipes throughout 360°.

Heretofore in some situations, where it was absolutely necessary that there be perfect seal between the outlet of a muffler and the exhaust pipe or other pipe of a vehicle, the pipes at the overlap have been welded together to assure such seal and positive mechanical interlock. This is time consuming and costly. The present clamp eliminates welding.

MODIFIED PIPE CLAMP

A modified pipe clamping in the form of a U-bolt clamp assembly 61 is shown in conjunction with FIGS. 7 through 12.

Clamp assembly 61 includes U-bolt 19 whose bite portion 21 and corresponding inner semi-circular surface 23 is positioned around the assembled pipes 11 and 13 at their overlap 15 as above described with respect to FIG. 1.

U-bolt legs 25 and their threaded terminals 27 project through apertures 72 within the saddle plate assembly 63.

The saddle plate assembly includes saddle plate 67 which has a bottom straight edge 69 which is mounted upon base 71 of the channel plate 65 and is centrally located upon said base by the opposed pairs of longitudinally spaced bosses 73 upon the interior of said channel plate. The pairs of opposed bosses 73 are defined by the longitudinally spaced stakes or indentations 75 formed upon the outer surface of the channel side walls adjacent the bottom wall 71.

As above described, the saddle plate 67 has at its upper ends adjacent the upper ends of the concave seat 31 and extending laterally thereof a pair of oppositely directed keys 77.

These keys are slidably nested within the opposed keyways or slots 49 formed upon the interior of the legs 25 of U-bolt 19.

The keys 77 slidably and retainingly positioned within the keyways 49 guidably retain the saddle plate 67 so as to at all times be in general longitudinal alignment with the U-bolt 19. The U-bolt 19 when drawn up tightly with respect to the saddle plate assembly 61 causes the semi-circular surface 23 of the U-bolt and the concave surface 31 of the saddle plate to compressively engage and deform the adjacent overlapped engaging pipes 11 and 13 at their overlap 15 such as shown in FIG. 10.

As above described, there is formed an annular exterior channel 51 within outer pipe 13, a corresponding outer annular channel 53 within the inner pipe 11. Additionally as set forth in FIG. 10, there is formed an annular bead 55 within the outer pipe 13 which cooperatively and retainingly nests within the annular channel 53 of the inner pipe to provide a mechanical interlock therebetween throughout 360°. Said innerlock also defines an annular seal between the pipes 11 and 13 between the annular bead 55 and the annular recess 53 which extends throughout 360°.

Additionally, clamping function further provides an interlocking relationship between the clamp assembly and pipes and particularly bight portion of the U-bolt 19 and the concave surface 31 of the saddle plate and interlocking relationship with the outer pipe 13 within the annular channel 51 therein.

The clamping function is achieved by tightening of the fasteners 41 and corresponding lock washers 43 in the same manner as above described. The completed assembly is shown in FIGS. 9 and 10.

Having described my invention, reference should now be had to the following claims.

I claim:

1. A clamp for securing together the annular overlap of a pair of telescoped engaging inner and outer pipes comprising of a U-bolt having a semi-circular bight portion terminating in a pair of spaced legs having threaded end portions;
a saddle plate assembly aligned with and including a saddle plate opposed to said U-bolt and having a concave seat of semi-circular shape and having apertures to receive said legs;
a pair of upright keys on said saddle plate at the upper ends of said seat coplanar with and extending laterally outward thereof;
there being opposed spaced keyways formed in said U-bolt legs in lateral registry with said keys and outwardly thereof;
and fasteners threaded onto said end portions for operatively and compressively engaging said saddle plate assembly for tightly drawing together said U-bolt and saddle plate around said pipes in compression;
said keys guidably extending into said keyways respectively and interlocked therewith.

2. In the clamp of claim 1, said bight portion and saddle plate concave seat deforming said pipes forming outer annular channels in said pipes and a corresponding inner annular bead on the outer pipe nested within the channel upon the inner pipe, providing an annular mechanical interlock and seal between said pipes throughout 360°, and an annular mechanical interlock between said bight portion, saddle plate and outer pipe.

3. In the clamp of claim 1, said U-bolt and saddle plate assembly being in 1010-1020 steel.

4. In the clamp of claim 1, said keys being flexible, and adapted for limited lateral deflection into said keyways when said U-bolt and saddle plate are in pipe securing compression.

5. In the clamp of claim 1, said saddle plate assembly including a pair of spaced upright tubular portions laterally outward of said keys, said keys projecting above said tubular portions, said tubular portions defining said apertures, said bolt and portions extending through said tubular portions, said fasteners engaging said tubular portions.

6. In the clamp of claim 5, said saddle plate having a straight bottom edge extending at right angles to said U-bolt legs;
said tubular portions having abutment surfaces coplanar with said straight edge.

7. In the clamp of claim 5, said tubular portions being formed as lateral integral extensions of said saddle plate, and of circular form, end portions thereof being in registry with said saddle plate.

8. In the clamp of claim 5, said keys adjacent the upper ends of said tubular portions being notched for increased flexibility.

9. In the clamp of claim 1, said keyways being coplanar with said saddle plate and of a width greater than the thickness of said keys, to receive said keys for maintaining said saddle plate when under compression in a central plane passing through said U-bolt legs and said keyways.

10. In the clamp of claim 1, said saddle plate assembly including an elongated channel plate of U-shape in cross section apertured adjacent its opposite ends and extending transversely of and receiving said U-bolt legs;
said saddle plate being centrally supported within and mounted upon said channel plate;
said keys guidably extending into said keyways.

11. In the clamp of claim 10, said saddle plate having a straight bottom edge extending along said channel plate, said channel plate having a bottom wall defining an abutment surface for said fasteners.

12. In the clamp of claim 10, pairs of opposed spaced bosses upon said bottom wall within said channel plate retainingly engaging and centrally positioning said saddle plate.

13. A clamp for securing together the annular overlap of a pair of telescoped engaging inner and outer pipes comprising of a U-bolt having a semi-circular bight portion terminating in a pair of spaced legs having threaded end portions;
a saddle plate having a concave seat of semi-circular shape;

a pair of upright flexible keys formed in said saddle plate at the upper ends of said seat;

said plate terminating at its ends in a pair of upright tubular portions outwardly of said keys, said keys projecting above said tubular portions;

said bolt end portions extending through said tubular portions;

and fasteners threaded onto said end portions for operatively and compressively engaging said tubular portions for tightly drawing together said U-bolt and saddle plate around said pipes in compression;

there being opposed spaced keyways formed in said U-bolt legs in lateral registry with said keys and outwardly thereof;

said keys deflecting laterally into said keyways respectively and interlocked therewith.

* * * * *